US012738104B2

(12) United States Patent
Petersen

(10) Patent No.: US 12,738,104 B2
(45) Date of Patent: Sep. 15, 2026

(54) METHOD FOR OPERATING A MOTOR VEHICLE AND CORRESPONDING MOTOR VEHICLE

(71) Applicant: AUDI AG, Ingolstadt (DE)

(72) Inventor: Krister Petersen, Ingolstadt (DE)

(73) Assignee: Audi AG, Ingolstadt (DE)

( * ) Notice: Subject to any disclaimer, the term of this patent is extended or adjusted under 35 U.S.C. 154(b) by 77 days.

(21) Appl. No.: 18/855,395

(22) PCT Filed: Feb. 23, 2023

(86) PCT No.: PCT/EP2023/054490
§ 371 (c)(1),
(2) Date: Oct. 9, 2024

(87) PCT Pub. No.: WO2023/217425
PCT Pub. Date: Nov. 16, 2023

(65) Prior Publication Data

US 2025/0336245 A1 Oct. 30, 2025

(30) Foreign Application Priority Data

May 11, 2022 (DE) ......................... 102022111771.5

(51) Int. Cl.
*G07C 5/06* (2006.01)
*B60W 50/02* (2012.01)
(Continued)

(52) U.S. Cl.
CPC ........... *G07C 5/06* (2013.01); *B60W 50/0205* (2013.01); *B60W 50/029* (2013.01);
(Continued)

(58) Field of Classification Search
CPC ....... G07C 5/06; G07C 5/04; B60W 50/0205; B60W 50/029; B60W 50/038; B60W 2510/1005; B60W 2510/18; B60W 2510/20; B60W 2510/242; B60W 2710/1005; B60W 2710/18;
(Continued)

(56) References Cited

U.S. PATENT DOCUMENTS 6,650,979 B1 * 11/2003 Kreft ........................ B60T 8/326 701/41
2014/0074336 A1 * 3/2014 Fehling ................. B60W 10/20 701/22
2023/0326262 A1 * 10/2023 Yu ......................... B62D 5/0457 701/29.4

FOREIGN PATENT DOCUMENTS

DE 19710082 A1 10/1998
DE 19735015 A1 * 2/1999 ............ B60T 8/3255
(Continued)

OTHER PUBLICATIONS

DE-19735015-A1_english_Machine Translation (Year: 1992).*
(Continued)

*Primary Examiner* — Faris S Almatrahi
*Assistant Examiner* — Dana F Artimez
(74) *Attorney, Agent, or Firm* — Maier & Maier, PLLC

(57) ABSTRACT

A method for operating a motor vehicle, the motor vehicle has a drive device and multiple X-by-wire control devices. A central computer of the motor vehicle determines an overall status from status messages transmitted by the control devices and controls the drive device and/or the control devices on the basis of the overall status.

20 Claims, 1 Drawing Sheet

(51) Int. Cl.
*B60W 50/029* (2012.01)
*B60W 50/038* (2012.01)
*G07C 5/04* (2006.01)
*B60R 16/033* (2006.01)

(52) U.S. Cl.
CPC ............. *B60W 50/038* (2013.01); *G07C 5/04* (2013.01); *B60R 16/033* (2013.01); *B60W 2510/1005* (2013.01); *B60W 2510/18* (2013.01); *B60W 2510/20* (2013.01); *B60W 2510/242* (2013.01); *B60W 2710/1005* (2013.01); *B60W 2710/18* (2013.01); *B60W 2710/20* (2013.01)

(58) Field of Classification Search
CPC .. B60W 2710/20; B60W 10/04; B60W 10/10; B60W 10/184; B60W 10/20; B60W 2050/043; B60W 2050/146; B60W 50/035; B60W 50/04; B60R 16/033; G06F 1/28; G06F 11/0721; G06F 11/0739; G06F 11/0751; G06F 11/182; G06F 11/3006; G06F 11/3013; G06F 11/3055; B60K 28/10
See application file for complete search history.

(56) References Cited

FOREIGN PATENT DOCUMENTS

| | | | | |
|---|---|---|---|---|
| DE | 19735017 | A1 * | 2/1999 | ......... B60R 16/0234 |
| DE | 19735018 | A1 | 2/1999 | |
| DE | 19832950 | A1 | 8/1999 | |
| DE | 102015223612 | A1 | 6/2017 | |
| DE | 102020108987 | A1 | 10/2021 | |
| DE | 102020206435 | A1 | 11/2021 | |
| EP | 1372125 | A2 * | 12/2003 | ............ G08C 17/02 |
| EP | 1372125 | A3 | 12/2008 | |
| WO | 9939950 | A1 | 8/1999 | |
| WO | 2004074048 | A1 | 9/2004 | |

OTHER PUBLICATIONS

DE-19735017-A1_English Translation (Year: 1992).*
EP-1372125-A2_English Translation (Year: 2003).*
S. Ganta and J. Wagner, “A power flow diagnostic framework for multi-domain dynamic systems with application to drive-by-wire ground vehicles,” Proceedings of the 2005, American Control Conference, 2005., Portland, OR, USA, 2005, pp. 465-471 vol. 1, doi: 10.1109/ACC.2005.1469979. (Year: 2005).*
International Search Report and Written Opinion issued on Jun. 12, 2023, in corresponding International Application No. PCT/EP2023/054490, 18 pages.
German Search Report issued on Jul. 17, 2023, in corresponding German Application No. 10 2022 111 771.5, 6 pages.
International Preliminary Report on Patentability issued on Nov. 21, 2024, in corresponding International Application No. PCT/EP2023/054490, 7 pages.
European Examination Report issued on Apr. 2, 2026, in corresponding European Application No. 23 709 596.3, 10 pages.

* cited by examiner

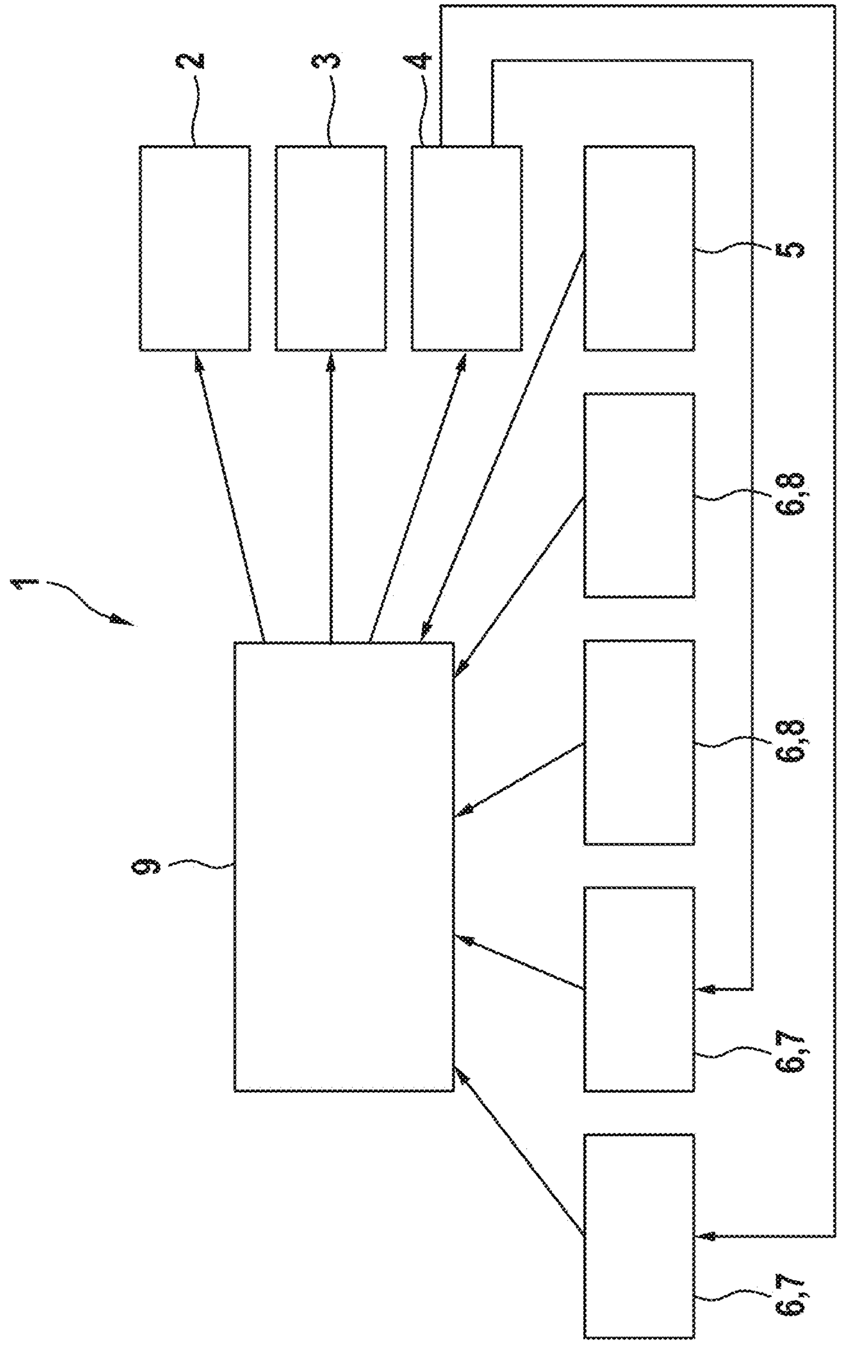
1
2
3
4
5
6,8
6,8
6,7
6,7
9

METHOD FOR OPERATING A MOTOR VEHICLE AND CORRESPONDING MOTOR VEHICLE

FIELD

The invention relates to a method for operating a motor vehicle, wherein the motor vehicle has a drive device and multiple X-by-wire control devices. The invention further relates to a motor vehicle.

BACKGROUND

DE 197 35 018 A1, for example, is known from the prior art. This describes a system architecture for implementing functions in a motor vehicle, comprising at least two X-by-wire systems, the control units of which are connected to each other directly or via a bus structure.

Furthermore, DE 197 10 082 A1 describes a drive system for commercial vehicles, in particular for agricultural or industrial tractors, which contains a generator driven by an internal combustion engine, at least one drive axle, the wheels of which are each driven by an associated electric motor powered by the generator, at least one steering axle, the wheels of which are steered jointly or individually by steering actuators, and manual control elements for at least the driving functions of steering and speed setting.

In addition, publication WO 99/39950 A1 discloses a method for controlling or regulating the braking system of a vehicle according to the break-by-wire principle, which has a brake pedal with a pedal mechanism and a pedal sensor system, an electronic evaluation unit and wheel brake modules, with the steps: detecting the brake pedal actuation by the driver by means of at least two measuring devices that determine variables characterizing the brake pedal actuation; and determining the driver's braking request from the signals of the measuring devices in the electronic evaluation unit. It is intended that the measuring devices determine the same variable characterizing the brake pedal actuation to determine the braking request, and that a further measured variable is derived for monitoring the pedal mechanism and the pedal sensors and compared with the braking request signal in the electronic evaluation unit.

SUMMARY

It is an object of the invention to propose a method for operating a motor vehicle which has advantages over known methods, which in particular always enables reliable and safe operation of the motor vehicle also in the case of X-by-wire control devices without a mechanical fallback level.

This is achieved according to the invention with a method for operating a motor vehicle. It is provided that a central computer of the motor vehicle determines an overall status from status messages transmitted by the control devices and controls the drive device and/or the control devices on the basis of the overall status.

It is pointed out that the exemplary embodiments explained in the description are not restrictive; rather, any variations of the features disclosed in the description, the claims and the FIGURES can be implemented.

The method is used for operating the motor vehicle. The motor vehicle is provided with the drive device and the X-by-wire control devices. The drive device is used to drive the motor vehicle and thus to provide a torque that is for driving the motor vehicle. To provide the drive torque, the drive device has at least one drive unit, for example an internal combustion engine or an electric traction machine. Of course, the drive device can also have multiple drive units which, at least temporarily, jointly provide the drive torque. In this case, drive units of different types are preferred; for example, one of the drive units is an internal combustion engine and another of the drive units is an electric traction machine.

Furthermore, the vehicle is provided with the multiple X-by-wire control devices. This refers to control devices which are controlled exclusively electrically and therefore have no mechanical fallback level. The X-by-wire control devices comprise, for example, one or more brake-by-wire control devices, one or more steer-by-wire control devices and/or one or more shift-by-wire control devices. The control devices may thus be provided for braking, steering or gear shifting or may carry out such operations at least temporarily.

The brake-by-wire control devices are used for braking, the steer-by-wire control devices are used for steering and the shift-by-wire control devices are used for gear shifting. Each brake-by-wire control device comprises one or more wheel brakes with brake actuators, which are controlled purely electronically. The steer-by-wire control devices each have a steering actuator by means of which a steering angle of the motor vehicle can be adjusted and which are also controlled exclusively electronically.

Finally, the shift-by-wire control device has a shift actuator which is arranged in a gearbox of the motor vehicle. The gearbox is used to set a gear selected from multiple different gears or a corresponding gear ratio between the drive unit or one of the drive units and at least one driven wheel of the motor vehicle. The shift actuator is intended and designed to set the selected gear or the selected transmission ratio on the gearbox. The shift actuator is also controlled purely electronically.

Each of the X-by-Wire control devices is intended and designed to influence the driving operation of the motor vehicle, for example for braking, steering or gear shifting. Each of the control devices has, for example, a control element which is arranged in a passenger compartment of the motor vehicle and which is operatively connected to an actuator of the motor vehicle purely electronically, i.e. without a mechanical fallback level. Control devices of the same type can of course use the same control element. The brake-by-wire control devices are jointly controlled by means of a brake control device, in particular a brake pedal. The steer-by-wire control devices have a common steering control device, in particular a common steering wheel or the like. The actuator is, for example, the wheel brake or one of the wheel brakes, the steering actuator or the gearshift actuator.

In conventional motor vehicles, a mechanical connection is always available between the respective control element and the respective actuator, at least as a fallback level. Electronic control of the respective actuator can additionally be provided, wherein for example a brake booster, power steering or the like is operated electrically. This means that even in the event of a power failure, the vehicle can still be operated reliably, namely via the mechanical fallback level, although this may require greater effort.

However, the motor vehicle on which the method according to the invention is based has multiple X-by-wire control devices in which such a mechanical fallback level is not present.

Nevertheless, the vehicle must be able to be operated reliably and safely. For this reason, each of the control devices transmits a status message to the central computer at least temporarily. Preferably, the status messages are transmitted from the respective control device to the central computer periodically or permanently. In the case of periodic transmission, the interval between successive transmissions of the status message is such that, even in the event of a sudden malfunction, the central computer can initiate countermeasures in due time to ensure the safety of the motor vehicle.

Preferably, the central computer is separate from the control devices, thus representing an additional device of the motor vehicle. The central computer and the control devices are connected to one another in terms of communication, in particular via a bus system, for example via a CAN bus or Flexray bus. However, it can also be provided that one of the control devices has the central computer or takes over its tasks. In this case, however, the control device and the central computer are formed by different circuits, so that a defect in the control device does not also cause a defect in the central computer. Particularly preferably, the central computer is part of a control unit of the drive device, which can also be referred to as an engine control unit. In this case, it is ensured that if the central computer is defective, the engine control unit will not function and the drive system will therefore be out of operation.

The central computer receives the status messages transmitted by the control devices and uses them to determine the overall status. This means that the overall status depends on all status messages transmitted by the control devices. The absence of status messages from one or more of the control devices can also influence the overall status. The overall status is therefore provided as a function of the status messages. The overall status describes the overall condition of the multiple X-by-Wire control devices and consequently of the technical equipment of the motor vehicle. The central computer controls the drive device and/or the control devices based on the overall status, in particular to influence the driving operation of the motor vehicle. This preferably means that the central computer transmits a control command to the drive device and/or the control devices, which depends on the overall status.

The drive device and/or the control devices are in turn controlled depending on the transmitted control command. Based on the control command, for example, activation of the drive device is permitted or prevented or the drive device is deactivated. It can also be provided that one of the control devices is controlled on the basis of the control command to influence the driving operation of the motor vehicle, for example for braking, steering or gear shifting.

The central computer, which can also be referred to as a central coordinator, serves to collect and summarize the status messages into the overall status and to control at least one device of the motor vehicle, namely the drive device and/or the control devices. This enables central control of the vehicle to be implemented in order to ensure its safety at all times. In addition, the central computer can be used to provide a consistent display for the user of the motor vehicle, which is not based on the individual status messages, but rather on the overall status. This avoids the display of different status messages from the control devices, which can be confusing for the user. Overall, this ensures safe and consistent operation of the vehicle.

A further development of the invention provides that each of the control devices carries out a self-diagnosis and, based on a result of the self-diagnosis, determines a control device state and/or a residual running variable of the motor vehicle, which is transmitted to the central computer as part of the respective status message. The residual running variable is in particular a remaining time or a remaining distance. The remaining running time describes the still permissible travel time and the remaining distance describes the still permissible travel distance. The self-diagnosis is used to determine the status of the respective control device. If it is determined during the self-diagnosis that the respective control device can be operated properly, this is recorded in the control device status and transmitted to the central computer as a status message. However, if the self-diagnosis determines that there is a fault in the respective control device, the fault is recorded in the control device status.

Additionally or alternatively, the residual running variable of the motor vehicle is determined, which is permissible in case of the fault, for example due to legal requirements. The residual running variable is read out from a table in which it is stored, for example, depending on the fault or the control device status. The control device status and/or the residual running variable are then transmitted to the central computer in the form of a status message. The residual running variable, in particular the remaining time or the remaining distance, is measured from the first occurrence of the fault or starts running from this point in time. Such an approach ensures that the status messages transmitted by the control devices always reflect the actual states of the control devices. For this purpose, the self-diagnosis of each of the control devices is preferably carried out at least before the activation of the drive device, but particularly preferably additionally periodically or permanently after the activation of the drive device.

A further development of the invention provides that the control devices are supplied with electrical power by means of a power supply device, wherein the power supply device carries out a self-diagnosis and, based on a result of the self-diagnosis, determines a power supply device state and/or a further residual running variable of the motor vehicle, which is transmitted to the central computer as part of a further status message, wherein the central computer takes the further status message into account when determining the overall status. The power supply device serves to supply the control devices with electrical power. If the power supply fails, the control devices are no longer supplied with electrical current and are therefore no longer functional.

The self-diagnosis of the power supply device is carried out in a similar way to the procedure for the control devices. The result of the self-diagnosis is summarized in the power supply device status or the other residual running variable and communicated to the central computer as a further status message. The further residual running variable is preferably a further remaining running time or a further remaining running distance, analogous to the residual running variable. The central computer receives the further status message and takes it into account when determining the overall status. In particular, the overall status is based on the power supply device status and/or the further residual running variable of the motor vehicle. The residual running variable describes the time over which the motor vehicle can be operated safely based on the result of the self-diagnosis. In particular, legal requirements are taken into account. Incorporating the result of the power supply device's self-diagnosis into determining the overall status enables a particularly reliable and comprehensive diagnosis of the motor vehicle.

A further development of the invention provides that the overall status comprises an overall state which is determined based on the control device states and/or the power supply device state, and/or that the overall status comprises an overall residual running variable which is determined based on the residual running variables and/or the further residual running variable. The overall status therefore contains the overall state, the overall residual running variable or both. The overall state is determined from the control device states and, optionally, from the power supply device state. Analogously, the overall residual running variable is determined from the residual running variables of the control devices and—optionally—from the further residual running variable of the power supply device.

For example, the overall state is only set to a first value that corresponds to a full functionality of the motor vehicle if the control device states and/or the power supply device state indicate the full functionality of the respective device. Whenever one of the control device states and/or the power supply device state indicates a fault in the respective device, the overall state is set to a second value that indicates a fault. The overall residual running variable is preferably set to the shortest of the residual running variables and/or the further residual running variable. This ensures that the vehicle can be operated reliably and safely over the entire residual running variable. The overall residual running variable is measured from the first occurrence of a fault in one of the devices or starts to run from this point on.

A further development of the invention provides that the overall state is set to a first overall state value if the control device states have values that correspond to functional control devices and/or the power supply device state has a value that corresponds to a functional power supply device and/or that the overall state is set to a second overall state value if one of the control device states has a value that corresponds to a non-functional control device and/or the power supply device state has a value that corresponds to a non-functional power supply device. This has already been addressed.

In this respect, the overall state only has the first overall state value if all control device states or the power supply device state indicate that the respective device is functional. Conversely, the overall state is set to the second overall state value if only one of the control device states and/or the power supply device state has the value that indicates a non-functional device. As a result, a high level of safety of the motor vehicle is achieved.

A further development of the invention provides that the overall running variable is set to the smallest value of the residual running variables and/or the further residual running variable. This has also been already addressed. Using the currently smallest value for the overall residual running variable has the particular advantage that the user of the motor vehicle is always shown the residual running variable over which the motor vehicle can still be operated reliably and safely.

A further development of the invention provides that the self-diagnosis of the control devices and the transmission of the status messages to the central computer take place when the drive device is deactivated and activation of the drive device is only permitted if the determined overall state corresponds to the first overall state value and/or the overall residual running variable has not yet expired, and/or that the self-diagnosis of the control devices and the transmission of the status messages to the central computer take place when the drive device is activated and the drive device and/or the control devices are controlled to stop the motor vehicle if the determined overall state corresponds to the second overall state value and/or the overall residual running variable has expired.

The self-diagnosis of the control devices and the transmission of status messages takes place when the drive device is deactivated, when the drive device is activated or when the drive device is deactivated as well as when the drive device is activated. A deactivated drive device means that the drive device is not ready to provide the drive torque. In a deactivated internal combustion engine, for example, the ignition and/or fuel supply are interrupted. In particular, the speed of the internal combustion engine is zero. In a deactivated electric traction machine, for example, the supply of electrical energy to the traction machine, in particular to its power electronics, is interrupted. If the drive device is activated, it is ready to provide the drive torque, i.e. the internal combustion engine is started and has a speed which is non-zero; the electric traction machine or its power electronics is supplied with electrical current.

If the drive device is deactivated, its activation is only permitted if the overall state indicates that proper operation of the control devices or the power supply device is possible and consequently the overall state has the first overall state value and/or the overall residual running variable has not yet expired. If the overall state does not have the first overall state value or if the overall residual running variable has expired, the activation of the drive device is prevented.

Additionally or alternatively, the described procedure is applied when the drive device is activated. If in this case the overall state does not have the first overall state value and/or the overall residual running variable has expired, the drive device and/or the control devices are activated to stop the motor vehicle. Otherwise, continued driving operation will be permitted. Such a procedure has the advantage that starting the motor vehicle is not permitted if there is a defect in one of the control devices or that the driving operation of the motor vehicle is terminated immediately or with a time delay if the defect occurs. Thus a high level of safety of the motor vehicle is achieved.

A further development of the invention provides that a plurality of the following devices are used as control devices: brake-by-wire control device, steer-by-wire control device and shift-by-wire control device. The various control devices have already been mentioned. Preferably, the control devices comprise multiple brake-by-wire control devices and/or a plurality of steer-by-wire control devices and/or a plurality of shift-by-wire control devices, which are each designed to be redundant with respect to one another. Each of the multiple brake-by-wire control devices is provided and designed to brake the same wheel or wheels of the motor vehicle. Similarly, each of the steer-by-wire control devices is provided and designed to adjust the steering angle of the motor vehicle. The multiple shift-by-wire control devices are provided and designed to operate the same shift gearbox. The redundant design of the control devices ensures a high level of safety for the motor vehicle.

A further development of the invention provides that the overall status is displayed to a user of the motor vehicle by means of a display device. The display device is, for example, an optical, acoustic and/or tactile display device. For example, the user is shown the overall state and/or the overall residual running variable of the vehicle. The advantage of using the overall status for the display device is that it provides a uniform and consistent display to the user. This avoids the display of individual status messages from the control devices, which can be inconsistent and confusing for the user.

The invention further relates to a motor vehicle, in particular for carrying out the method according to the statements in the context of this description, wherein the motor vehicle has a drive device and multiple X-by-wire control devices. It is provided that a central computer of the motor vehicle determines an overall status from status messages transmitted by the control devices and controls the drive device and/or the control devices on the basis of the overall status.

The advantages of such an embodiment of the motor vehicle or of such a procedure have already been discussed. Both the motor vehicle and the method for operating it can be further developed according to the embodiments in the scope of this description, to which reference will therefore be made.

The features and feature combinations described in the description, in particular the features and feature combinations described below in the description of the figures and/or shown in the FIGURES may be used not only in the respective specified combination, but also in other combinations or alone, without departing from the scope of the invention. The invention should therefore also be considered to comprise embodiments that are explicitly not shown or explained in the description and/or the FIGURES, but which arise from the explained embodiments or can be derived from them.

BRIEF DESCRIPTION OF THE FIGURE(S)

In the following, the invention will be explained in greater detail with reference to the exemplary embodiments depicted in the drawings, without this limiting the invention. In particular, the only FIGURE is a schematic representation of a motor vehicle having a drive device and multiple X-by-wire control devices.

FIGURE shows a schematic representation of a motor vehicle 1. The motor vehicle 1 has a display device 2 which is arranged in an interior, in particular in a passenger compartment, of the motor vehicle 1. Preferably, the display device 2 is located on a dashboard of the motor vehicle 1. Furthermore, the motor vehicle 1 has a drive device 3 and a driver assistance device 4. Furthermore, a power supply device 5 and multiple X-by-wire control devices 6 are part of the motor vehicle. A plurality of the control devices 6 are present as brake-by-wire control devices 7 and a plurality as steer-by-wire control devices 8. The control devices 6 are therefore designed redundantly.

The control devices 6 and the power supply device 5 each carry out a self-diagnosis and transmit the result of this self-diagnosis as part of a status message to a central computer 9, which is also part of the motor vehicle 1. The central computer 9 determines an overall status from the individual status messages of the control devices 6 and the power supply device 5 and controls the drive device 3 and/or the control devices 6 depending on the overall status. In addition, it can be provided to display the overall status to a user of the motor vehicle 1 by means of the display device 2.

The control is carried out in such a way that the drive device 3 is either released for activation or activation is prevented depending on the overall status. Activation means preparing for the provision of a drive torque aimed at driving the motor vehicle. If the activation of the drive device 3 is prevented, it cannot provide the drive torque, so that the motor vehicle 1 remains at a standstill. If the motor vehicle 1 is already in motion, depending on the overall status, the driver assistance device 4 may be controlled to brake the motor vehicle 1. For this purpose, the driver assistance device 4 in turn controls the corresponding control devices 6, more precisely the brake-by-wire control devices 7. Preferably, not only one of the brake-by-wire control devices 7, but multiple, in particular all, of the brake-by-wire control devices 7 are controlled for braking the vehicle 1. This ensures reliable operation of the motor vehicle 1.

LIST OF REFERENCE NUMERALS

1 motor vehicle
2 display device
3 drive device
4 driver assistance device
5 power supply device
6 X-by-wire control device
7 brake-by-wire control device
8 steer-by-wire control device
9 central computer

The invention claimed is:

1. A method for operating a motor vehicle, wherein the motor vehicle has a drive device and multiple X-by-wire control devices, wherein a central computer of the motor vehicle determines an overall status comprising an overall residual running variable from status messages that include residual running variables transmitted by the control devices and controls the drive device and the multiple control devices based on the overall status, wherein the drive device is controlled based on whether the overall residual running variable has expired.

2. The method according to claim 1, wherein each of the control devices carries out a self-diagnosis and, based on a result of the self-diagnosis, determines a control device state and/or a residual running variable of the motor vehicle, which is transmitted to the central computer as part of the respective status message.

3. The method according to claim 2, wherein the control devices are supplied with electrical power by means of a power supply device, wherein the power supply device carries out a self-diagnosis and, based on a result of the self-diagnosis, determines a power supply device state and/or a further residual running variable of the motor vehicle, which is transmitted to the central computer as part of a further status message, wherein the central computer takes the further status message into account when determining the overall status.

4. The method according to claim 2, wherein the overall status comprises an overall state which is determined on the basis of the control device states and/or a power supply device state, and/or in that the overall status comprises an overall residual running variable which is determined on the basis of residual running variables and/or a further residual running variable.

5. The method according to claim 2, wherein an overall state is set to a first overall state value if the control device states have values that correspond to functional control devices and/or the power supply device state has a value that corresponds to a functional power supply device and/or in that the overall state is set to a second overall state value if a state of one of the control devices has a value that corresponds to a non-functional control device and/or the power supply device state has a value that corresponds to a non-functional power supply device.

6. The method according to claim 2, wherein the overall residual running variable is set to a smallest value of residual running variables and/or a further residual running variable.

7. The method according to claim 1, wherein the control devices are supplied with electrical power by means of a power supply device, wherein the power supply device carries out a self-diagnosis and, based on a result of the self-diagnosis, determines a power supply device state and/ or a further residual running variable of the motor vehicle, which is transmitted to the central computer as part of a further status message, wherein the central computer takes the further status message into account when determining the overall status.

8. The method according to claim 7, wherein the overall status comprises an overall state which is determined on the basis of the control device states and/or a power supply device state, and/or in that the overall status comprises an overall residual running variable which is determined on the basis of residual running variables and/or a further residual running variable.

9. The method according to claim 7, wherein an overall state is set to a first overall state value if the control device states have values that correspond to functional control devices and/or the power supply device state has a value that corresponds to a functional power supply device and/or in that the overall state is set to a second overall state value if a state of one of the control devices has a value that corresponds to a non-functional control device and/or the power supply device state has a value that corresponds to a non-functional power supply device.

10. The method according to claim 7, wherein the overall residual running variable is set to a smallest value of residual running variables and/or a further residual running variable.

11. The method according to claim 1, wherein the overall status comprises an overall state which is determined on the basis of a control device states and/or a power supply device state, and/or in that the overall status comprises an overall residual running variable which is determined on the basis of residual running variables and/or a further residual running variable.

12. The method according to claim 11, wherein an overall state is set to a first overall state value if the control device states have values that correspond to functional control devices and/or the power supply device state has a value that corresponds to a functional power supply device and/or in that the overall state is set to a second overall state value if a state of one of the control devices has a value that corresponds to a non-functional control device and/or the power supply device state has a value that corresponds to a non-functional power supply device.

13. The method according to claim 11, wherein the overall residual running variable is set to a smallest value of residual running variables and/or a further residual running variable.

14. The method according to claim 1, wherein an overall state is set to a first overall state value if control device states have values that correspond to functional control devices and/or the power supply device state has a value that corresponds to a functional power supply device and/or in that the overall state is set to a second overall state value if a state of one of the control devices states has a value that corresponds to a non-functional control device and/or the power supply device state has a value that corresponds to a non-functional power supply device.

15. The method according to claim 14, wherein the overall residual running variable is set to a smallest value of residual running variables and/or a further residual running variable.

16. The method according to claim 1, wherein the overall residual running variable is set to a smallest value of residual running variables and/or a further residual running variable.

17. The method according to claim 1, wherein a self-diagnosis of the control devices and the transmission of the status messages to the central computer take place when the drive device is deactivated and activation of the drive device is only permitted if a determined overall state has a first overall state value and/or the overall residual running variable has not yet expired, and/or in that the self-diagnosis of the control devices and the transmission of the status messages to the central computer take place when the drive device is activated and the drive device and/or the control devices are controlled to stop the motor vehicle if the determined overall state has a second overall state value and/or the overall residual running variable has expired.

18. The method according to claim 1, wherein a plurality of the following devices are used as control devices: brake-by-wire control device, steer-by-wire control device and shift-by-wire control device.

19. The method according to claim 1, wherein the overall status is displayed to a user of the motor vehicle by means of a display device.

20. A motor vehicle, in particular for carrying out the method according to claim 1, wherein the motor vehicle has a drive device and multiple X-by-wire control devices, wherein a central computer of the motor vehicle is provided and designed to determine an overall status from status messages transmitted by the control devices and to control the drive device and/or the control devices on the basis of the overall status.

* * * * *